(12) United States Patent
Theobald et al.

(10) Patent No.: US 11,529,834 B2
(45) Date of Patent: Dec. 20, 2022

(54) VEHICLE WITH WEAR PLATE

(71) Applicant: BOMBARDIER RECREATIONAL PRODUCTS INC., Valcourt (CA)

(72) Inventors: Eric Theobald, Shefford (CA); Jean-Pierre Bourgeois, Cowansville (CA); Michel Boisclair, Saint-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/213,978

(22) Filed: Mar. 26, 2021

(65) Prior Publication Data

US 2022/0305860 A1 Sep. 29, 2022

(51) Int. Cl.
*B60G 7/02* (2006.01)

(52) U.S. Cl.
CPC ............ *B60G 7/02* (2013.01); *B60G 2200/31* (2013.01); *B60G 2204/1434* (2013.01)

(58) Field of Classification Search
CPC ....................................................... B60G 7/02
See application file for complete search history.

(56) References Cited

U.S. PATENT DOCUMENTS

| | | | | |
|---|---|---|---|---|
| 4,573,699 A | * | 3/1986 | Smith ................ | B62D 53/0878 280/448 |
| 4,718,691 A | * | 1/1988 | Specktor ................ | B60G 7/02 280/86.753 |
| 5,186,485 A | * | 2/1993 | Orr ........................ | B60G 11/27 280/681 |
| 5,294,282 A | * | 3/1994 | Rock .................. | B65H 35/0033 269/21 |
| 6,293,570 B1 | * | 9/2001 | Gottschalk ............. | B62D 7/144 280/86.751 |
| 8,641,075 B1 | * | 2/2014 | Angel ...................... | B60D 1/30 280/484 |
| 2020/0282784 A1 | * | 9/2020 | Zimmerman ......... | F16F 1/3835 |
| 2021/0061036 A1 | | 3/2021 | Despres-Nadeau et al. | |

FOREIGN PATENT DOCUMENTS

DE   20104753 U1 *  6/2001   ............... B60G 7/02
EP    1481824 A1 * 12/2004   ............. B60G 11/10

OTHER PUBLICATIONS

DE 20104753 U1 translation from espacene.tcom Apr. 2022.*

* cited by examiner

*Primary Examiner* — Paul N Dickson
*Assistant Examiner* — Maxwell L Meshaka
(74) *Attorney, Agent, or Firm* — BCF LLP

(57) ABSTRACT

A vehicle including a frame; a motor; at least one ground engaging member; at least one suspension member pivotally connecting the ground engaging member to the frame; at least one double bonded bushing being disposed in an end portion of the at least one suspension member; at least one wear plate disposed between a first end of the at least one double bonded bushing and the frame, the at least one wear plate being rotationally fixed relative to the frame, the first end of the at least one double bonded bushing abutting the at least one wear plate, the at least one wear plate being selectively removable from the vehicle; and at least one shaft extending through a portion of the frame, the at least one double bonded bushing, and the at least one wear plate.

12 Claims, 10 Drawing Sheets

VEHICLE WITH WEAR PLATE

FIELD OF TECHNOLOGY

The present technology relates to vehicles having wear plates for suspension assemblies.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. These vehicles typically have suspension assemblies pivotally connected to the frame or chassis.

To be able to operate in off-road conditions, a side-by-side off-road vehicle needs to be able to handle bumpy terrain to operate on various surfaces including, but not limited to, sand, dirt and mud. These conditions represent unique challenges not typically encountered when designing on-road vehicles such as a car.

One such challenge is that the suspension assemblies need to have a large amount of travel to handle the bumpy terrain. These assemblies are often connected to the frame by bushings. If the bolt holding a suspension assembly member and a corresponding bushing to the frame becomes loose, the bushing or a portion thereof may rotate around the bolt.

Movement of the bushing during movement of the suspension assembly could cause rubbing against adjacent frame portions, damaging the frame. Such damage to the frame is often difficult to repair but may be necessary in order for a replacement bushing to work correctly.

Thus, there is a desire for a vehicle suspension arrangement for handling operating conditions of side-by-side off-road vehicles.

SUMMARY

It is an object of the present technology to ameliorate at least some of the inconveniences present in the prior art.

According to one aspect of the present technology, there is provided a vehicle having one or more replaceable wear plates for abutting a double bonded bushing used to connect a suspension arm to the frame of the vehicle. If the shaft or fastener extending through the bushing becomes loose, the bushing or a portion thereof could rotate about the shaft with movement of the suspension member. Edges of the bushing, especially in the case of textured end portions for additional grip, could then damage abutting surfaces. By including replaceable wear plates between the bushing edges and the frame, any damage caused by rubbing or slipping of the inner race is incurred on the selectively removeable wear plate. In the case of damage, the wear plate can be replaced, and the frame does not need to be repaired as it would without use of the wear plate. Additionally, the wear plate includes one or more alignment features, either being shaped to abut a protrusion or including alignment apertures for receiving protrusions or fasteners. As the one or more alignment features are offset from the axis of rotation of the corresponding suspension member, replacement of the wear plate can aid in realigning the pivot axis of the corresponding suspension member if damage to the frame has occurred.

According to an aspect of the present technology, there is provided a vehicle including a frame; a motor connected to the frame; at least one ground engaging member operatively connected to the motor; at least one suspension member pivotally connecting the at least one ground engaging member to the frame; at least one double bonded bushing pivotally connecting the at least one suspension member to the frame, the at least one double bonded bushing being disposed in an end portion of the at least one suspension member; at least one wear plate disposed between a first end of the at least one double bonded bushing and the frame, the at least one wear plate being rotationally fixed relative to the frame, the first end of the at least one double bonded bushing abutting the at least one wear plate, the at least one wear plate being selectively removable from the vehicle; and at least one shaft extending through a portion of the frame, the at least one double bonded bushing, and the at least one wear plate.

In some embodiments, at least a first end of an inner race of the at least one double bonded bushing is textured, the textured first end of the inner race abutting the at least one wear plate.

In some embodiments, at least the first end of the inner race of the at least one double bonded bushing is serrated.

In some embodiments, the at least one wear plate is a first wear plate; and further including a second wear plate disposed between and abutting a second end of the at least one double bonded bushing and the frame, the second end being oppositely disposed to the first end of the at least one double bonded bushing.

In some embodiments, the at least one wear plate defines therein at least one alignment aperture; the at least one wear plate defines a shaft aperture therein, the at least one shaft extending therethrough; and the at least one alignment aperture is offset and separate from the shaft aperture.

In some embodiments, the frame includes at least one protrusion; and the at least one protrusion of the frame is received in the at least one alignment aperture.

In some embodiments, at least one plate fastener extends through the alignment aperture of the at least one wear plate to fasten the at least one wear plate to the frame.

In some embodiments, the at least one plate fastener is at least one rivet.

In some embodiments, the at least one plate fastener is at least one bolt.

In some embodiments, the at least one shaft is formed by at least one fastener extending through the portion of the frame, the at least one double bonded bushing, and the shaft aperture of the at least one wear plate.

In some embodiments, the at least one suspension member is a plurality of suspension members; the at least one double bonded bushing is a plurality of bushings, one of the plurality of double bonded bushings being disposed in an end portion of each one of the plurality of suspension members; and the at least one wear plate is a plurality of wear plates.

In some embodiments, the at least one wear plate is shaped to abut at least one protrusion of the frame to impede rotational movement of the at least one wear plate.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a four-wheel off-road vehicle 10 having two side-by-side seats. However, it is contemplated that some aspects of the present technology may apply to other types of vehicles such as, but not limited to, four-wheel off-road vehicles having more than two side-by-side seats, off-road vehicles having a handlebar and a straddle seat (i.e. an all-terrain vehicle (ATV)), off-road vehicles having more or less than four wheels, and other vehicles with suspension assemblies with pivoting suspension arms, including both vehicles with wheels and vehicles with tracks.

Figure 1:
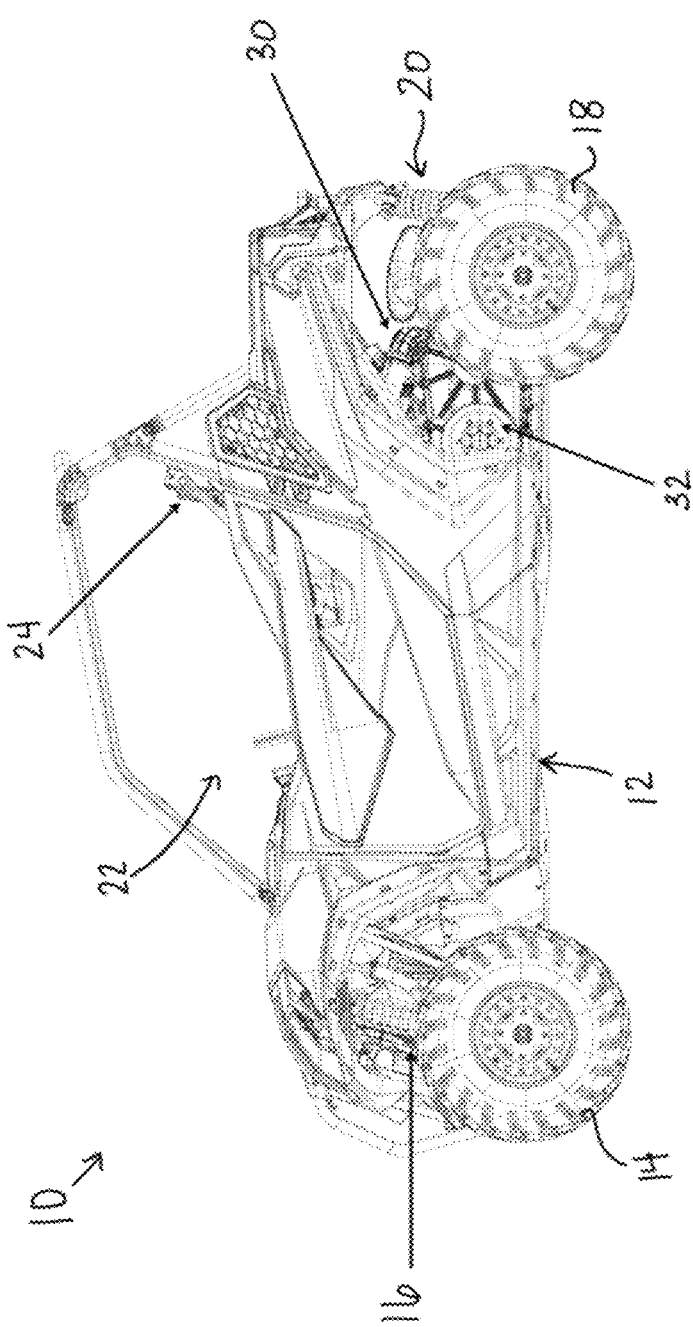
FIG. 1 is a left side elevation of an off-road vehicle.

One non-limiting example of an off-road vehicle 10 will be described with respect to FIG. 1. The vehicle 10 has a frame 12, two front wheels 14 connected to a front of the frame 12 by front suspension assemblies 16 and two rear wheels 18 connected to the frame 12 by rear suspension assemblies 20. The frame 12 defines a central cockpit area 22 inside which are disposed a driver seat 24 and a passenger seat (not shown).

An engine 30 is connected to the frame 12 in a rear portion of the vehicle 10. The engine 30 is connected to a continuously variable transmission (CVT) 32 disposed on a left side of the engine 30. The CVT 32 is operatively connected to the wheels 14, 18 to drive the vehicle 10. Additional details of vehicles such as the vehicle 10 can be found in at least U.S. Patent Publication No. 2021/0061036 A1, published on Mar. 4, 2021, the entirety of which is incorporated herein by reference.

Figure 2:
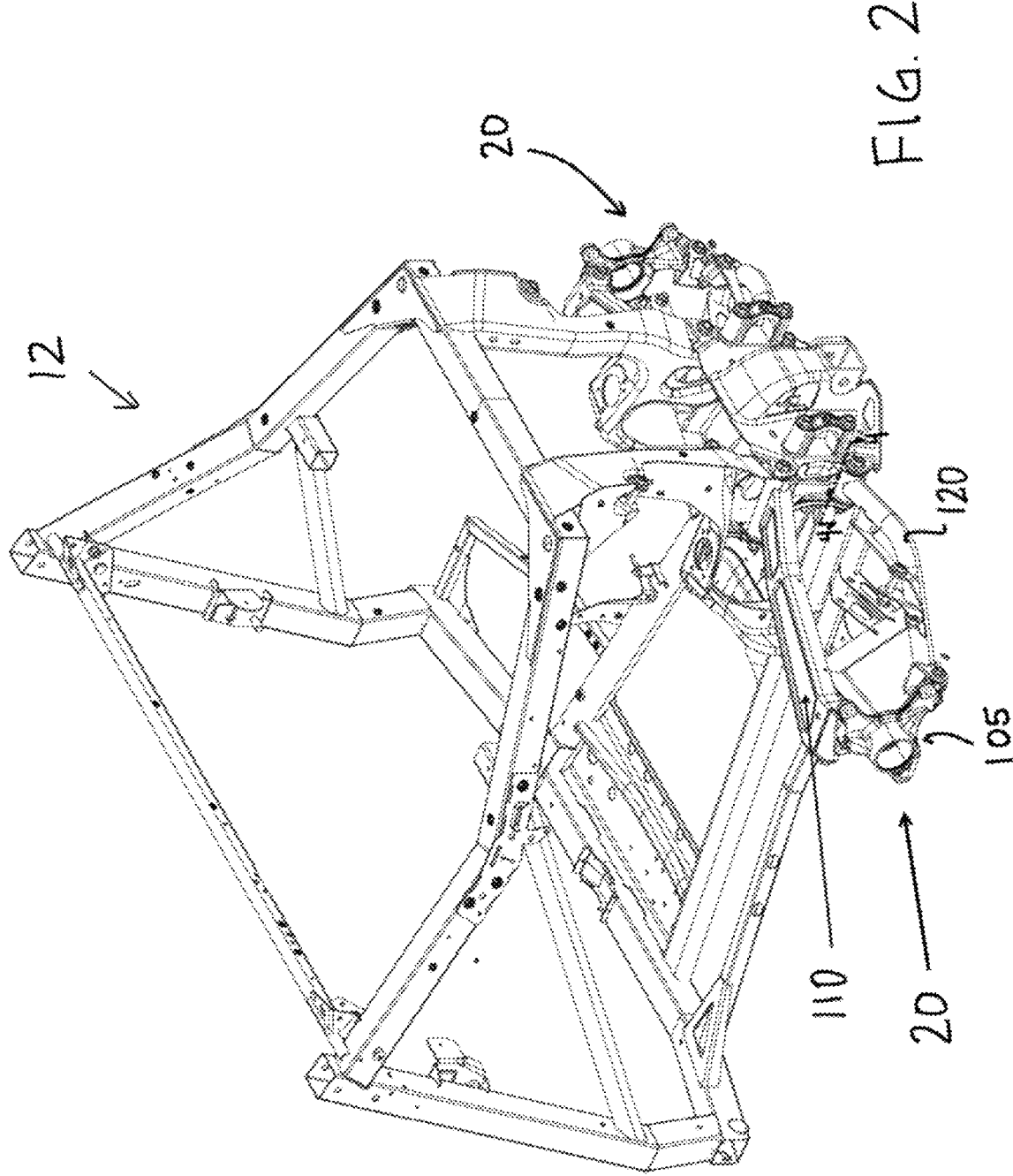
FIG. 2 is a rear, left side perspective view of a frame and suspension assemblies of the vehicle of FIG. 1.
Figure 3:
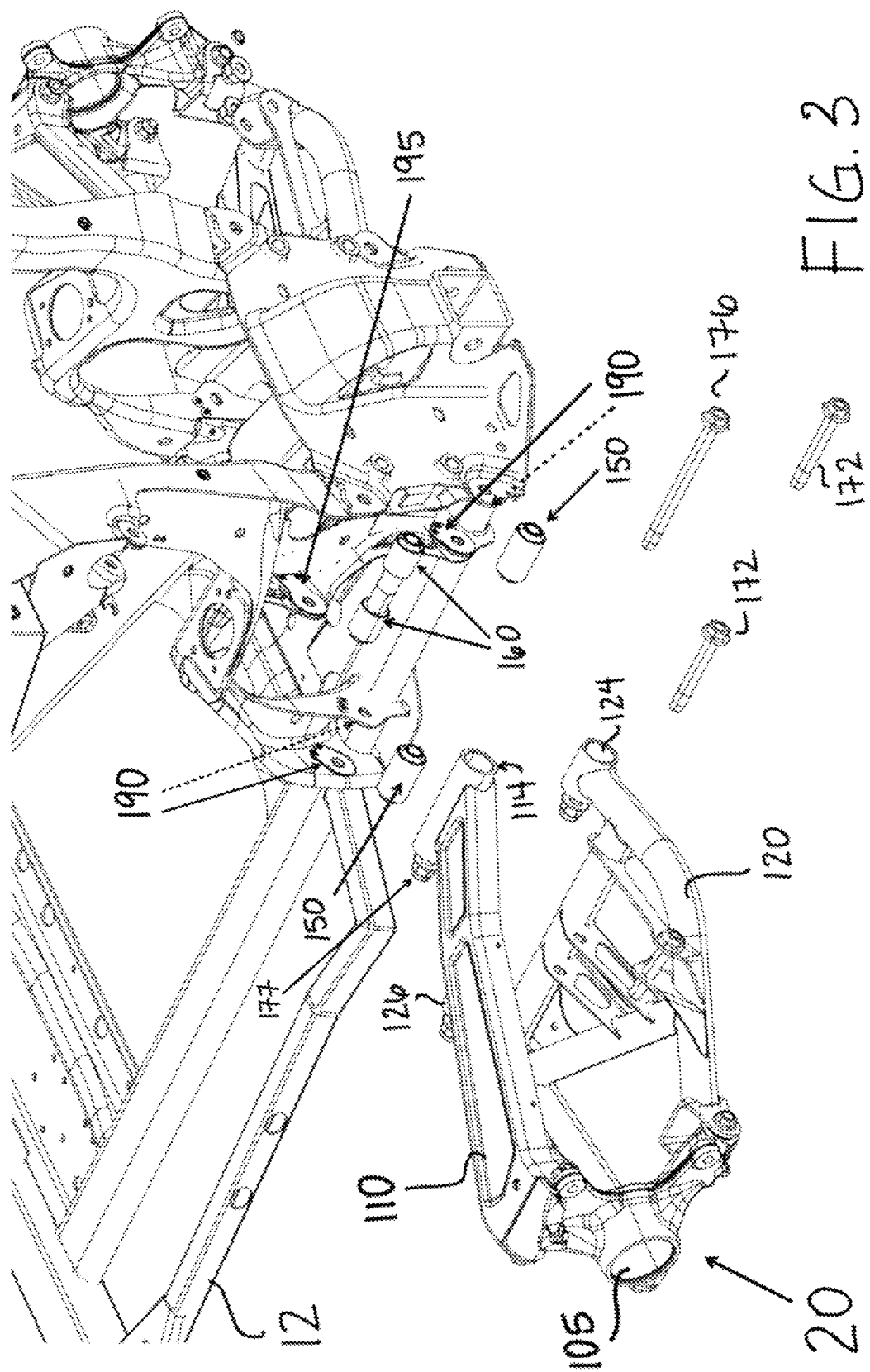
FIG. 3 is a close-up, exploded view of the frame and a left side suspension assembly of FIG. 2.

The rear suspension assemblies 20 of the vehicle 10 are shown in more detail in FIGS. 2 and 3. The left side suspension assembly 20 is described herein; details apply mutatis mutandis to the right side suspension assembly 20.

The suspension assembly 20 includes a knuckle 105 to which the wheel 18 is connected. An upper suspension arm 110 and a lower suspension arm 120 extend inward from the knuckle 105 to pivotally connect to the frame 12. The upper suspension arm 110 connects to the frame 12 via one pivoting end portion 114, although this could vary in different embodiments. The lower suspension arm 120 is specifically an A-arm 120 connecting to the frame 12 via two pivoting end portions 124, 126 in the present embodiment, although this could vary in different embodiments.

An inner end portion 114 of the suspension arm 110 and the inner end portions 124, 126 of the suspension arm 120 are pivotally connected to the frame 12 to allow for at least partially vertical motion of the knuckle 105. Specifically, a connected pair of double bonded bushings 160 is received in the end portion 114 and a double bonded bushing 150 is received in each end portion 124, 126, each bushing 150, 160 being fastened to the frame 12.

Figure 4:
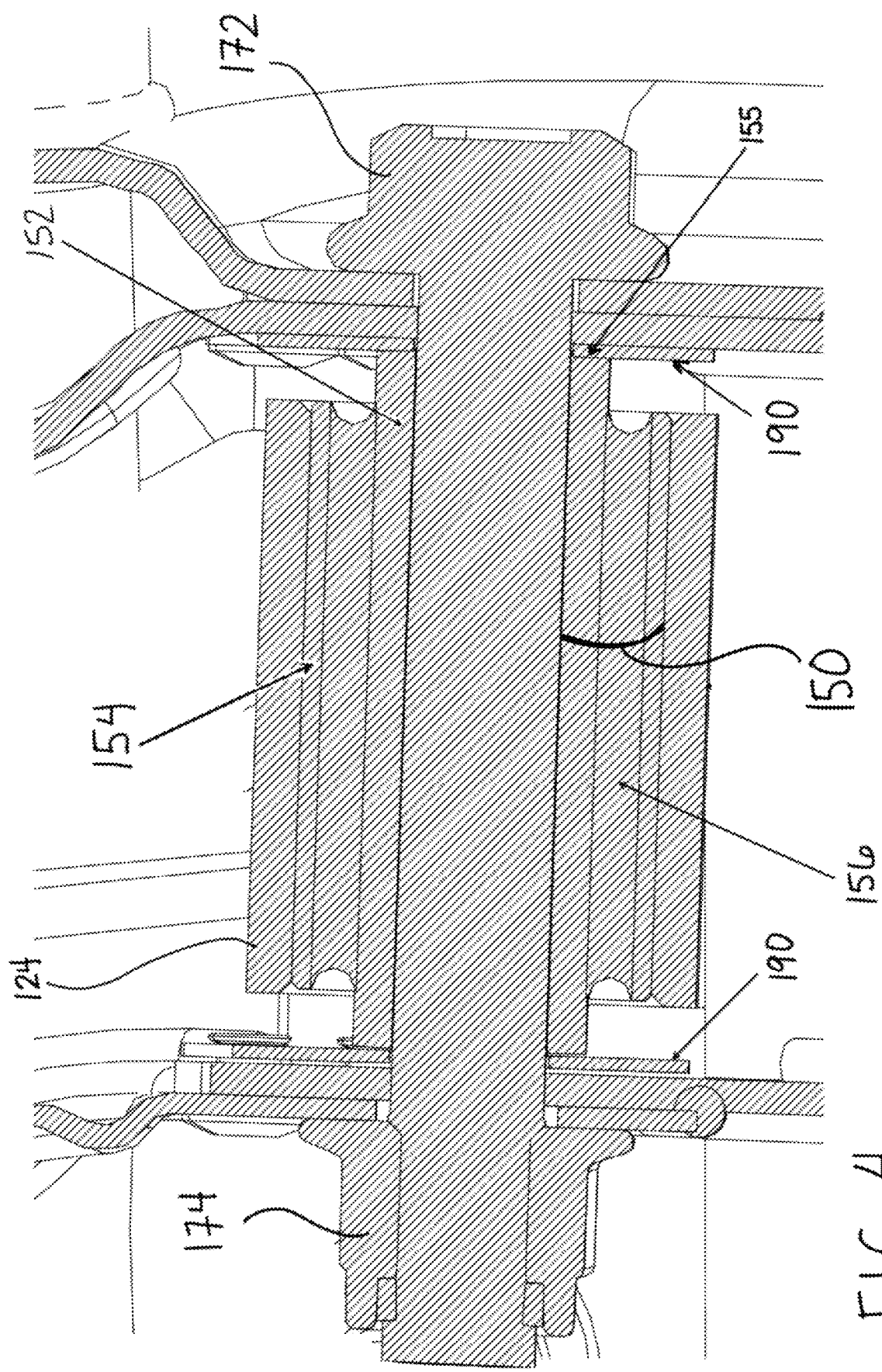
FIG. 4 is a cross-section view of portions of the left side suspension assembly, portions of the frame, and a double bonded bushing of FIG. 2.
Figure 5:
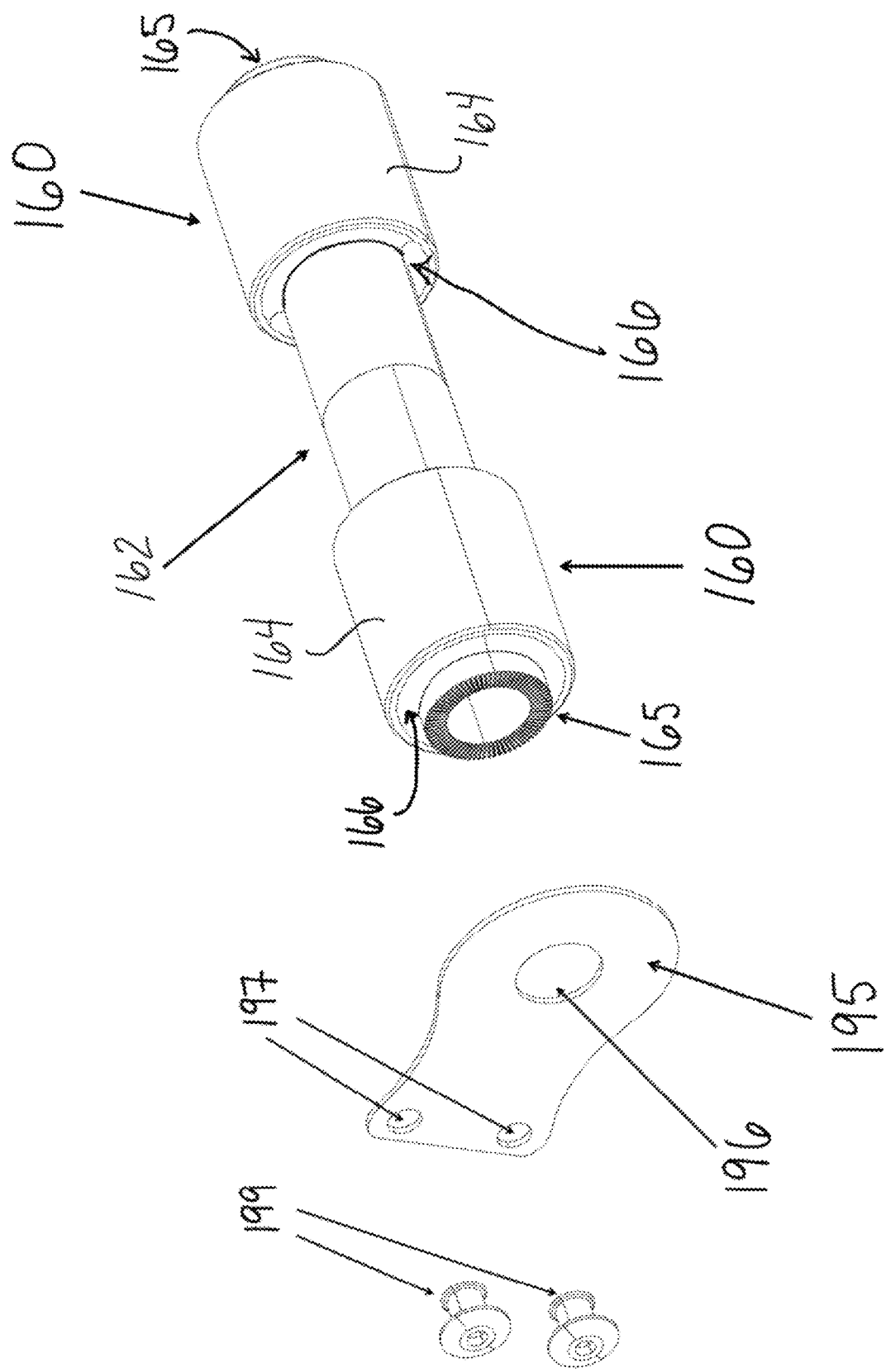
FIG. 5 is a perspective view of another double bonded bushing, a wear plate and fasteners of the frame and the left side suspension assembly of FIG. 2.

With additional reference to FIGS. 4 and 5, each double bonded bushing 150, 160 includes inner and outer races, also referred to as inner and outer sleeves. The bushing 150 includes an inner race 152 received in an outer race 154 (FIG. 4). The inner race 152 is rotatably connected to the outer race 154 via a resilient material 156, allowing elastic rotation between the two portions 152, 154. The bushings 160 include two abutting inner races 162 received in two separated outer race portions 164 (FIG. 5), the inner races 162 and the outer races 164 being similarly connected via a resilient material 166. The two outer races 164 are arranged to be moveable independently from each other. In the present embodiment, the resilient material 156, 166 is rubber bonding connecting the races 152, 154, 162, 164 together, although exact material and arrangement could vary. In some embodiments, the bushings 150, 160 could be implemented as a single bonded bushing.

Each inner race 152 is fastened to a portion of the frame 12, specifically by a bolt 172 and nut 174 extending through an aperture 62 in the portion of the frame 12 surrounding the bushing 150 in the present embodiment. The inner races 162 is fastened to a portion of the frame 12 by a bolt 176 and a nut 177. In some embodiments, different shaft embodiments could be used to pass through and attach the bushings 150, 160 to the frame 12. The fasteners 172, 174, 176, 177 of each bushing 150, 160 are tensioned such that the corresponding inner race 152, 162 is abutted by the frame 12 or a wear plate (described further below). In this way, each inner race 152, 162 is secured in place and prevented from rotating relative to the frame 12. The outer race 154, 164 of each bushing 150, 160 is press-fit into the corresponding end portion 114, 124, 126 such that the outer races 154, 164 do not rotate relative to the end portions 114, 124, 126. Rotation of the end portions 114, 124, 126 relative to the frame 12 thus happens by deformation of the resilient materials 156, 166 of the bushings 150, 160.

As can be seen in FIG. 5 for the bushing 160, end portions 155, 165 of each inner race 152, 162 are textured to increase friction between each inner race 152, 162 and abutting portions to minimize slipping of the inner race 152, 162 relative to the frame 12. In the present embodiment, the end portions 155, 165 are serrated. In some embodiments the end portions 155, 165 of each inner race 152, 162 could be differently textured, including omission of friction-augmenting texturing.

Figure 6:
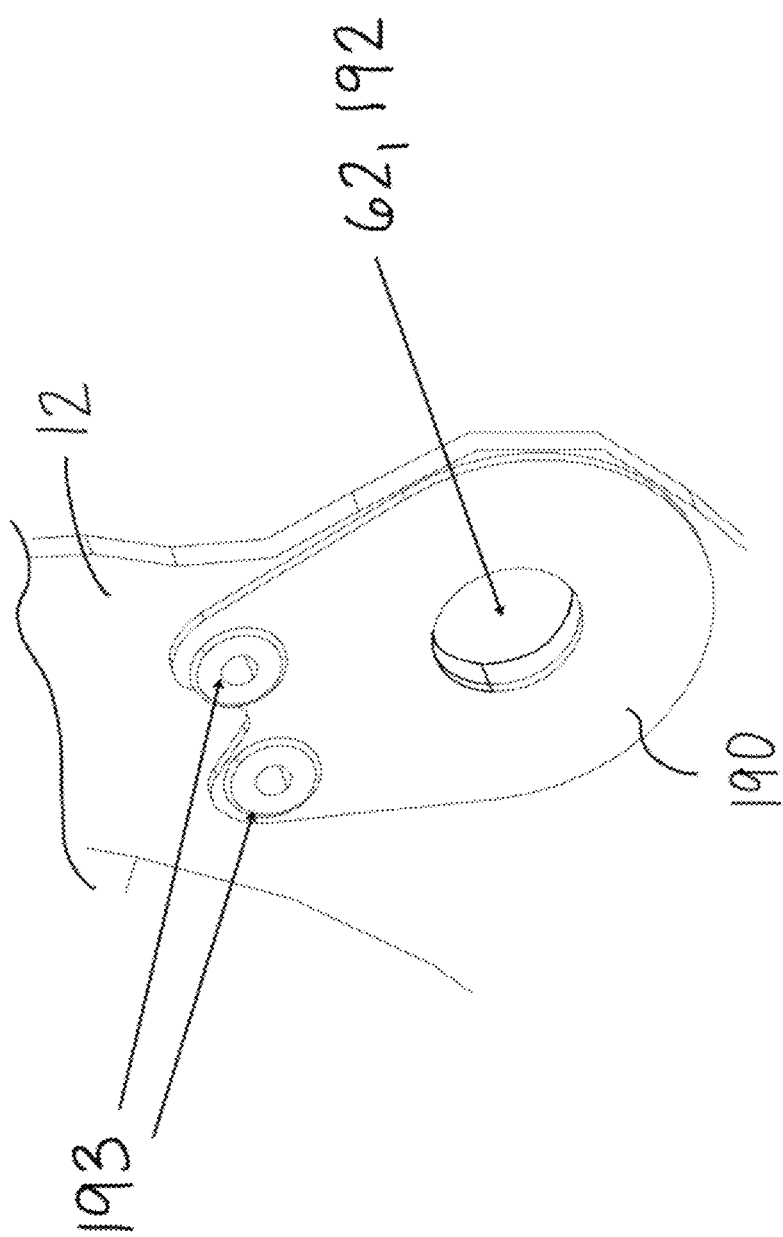
FIG. 6 is a perspective view of another wear plate and portions of the frame of FIG. 2.

With continued reference to FIG. 5 and additional reference to FIG. 6, the vehicle 10 further includes replaceable wear plates 190, 195 disposed between the inner races 152, 162 of the bushings 150, 160 and the portions of the frame 12 fastened around the bushings 150, 160. The wear plates 190, 195 are also illustrated in FIG. 3. Two wear plates 190 are included for each bushing 150, with end portions of each inner race 152 abutting one of the wear plates 190. In some embodiments, only one wear plate 190 for each bushing 150 may be included. One wear plate 195 is disposed abutting one of the end portions 165 of the inner race 162, although it is contemplated that an additional wear plate 195 could be included such that the bushings 160 would be disposed between two wear plates 195.

By abutting the textured end portions 155, 165 of the corresponding inner race 152, 162, the wear plate 190, 195 serves to aid in protecting the frame 12 from wear and/or damage from a slipping inner race 152, 162. Over time, it is possible that one of the fasteners 172, 176 could become loosened, which could allow the corresponding inner race 152, 162 to slip and rotate relative to the frame 12. As the ends of the inner races 152, 162 are textured, slippage of the inner race 152, 162 could wear or damage the surface abutting the textured end portions 155, 165. In the present technology, the wear plates 190, 195 would incur the damage from inner race slippage, if it were to occur, thereby aiding in preventing damage to the surrounding portions of the frame 12. As the wear plates 190, 195 are removable, damaged wear plates 190, 195 can be simply removed and replaced with new plates 190, 195.

The wear plate 190 defines therein a shaft aperture 192. The wear plate 195 defines therein a shaft aperture 196. When installed in the vehicle 10, the corresponding fastener 172, 176 extending through portions of the frame 12 and the bushings 150, 160 also extends through the corresponding shaft aperture 192, 196.

The wear plate 190 also defines therein two alignment apertures 194 (see also FIG. 8), both alignment apertures 194 being offset and separate from the shaft aperture 192. The wear plate 195 defines therein two alignment apertures 197, both alignment apertures 197 being offset and separate from the shaft aperture 196. Depending on the embodiment, each plate 190, 195 could include more or fewer alignment apertures 194, 197. Some non-limiting examples of such embodiments are described further below.

Figure 7:
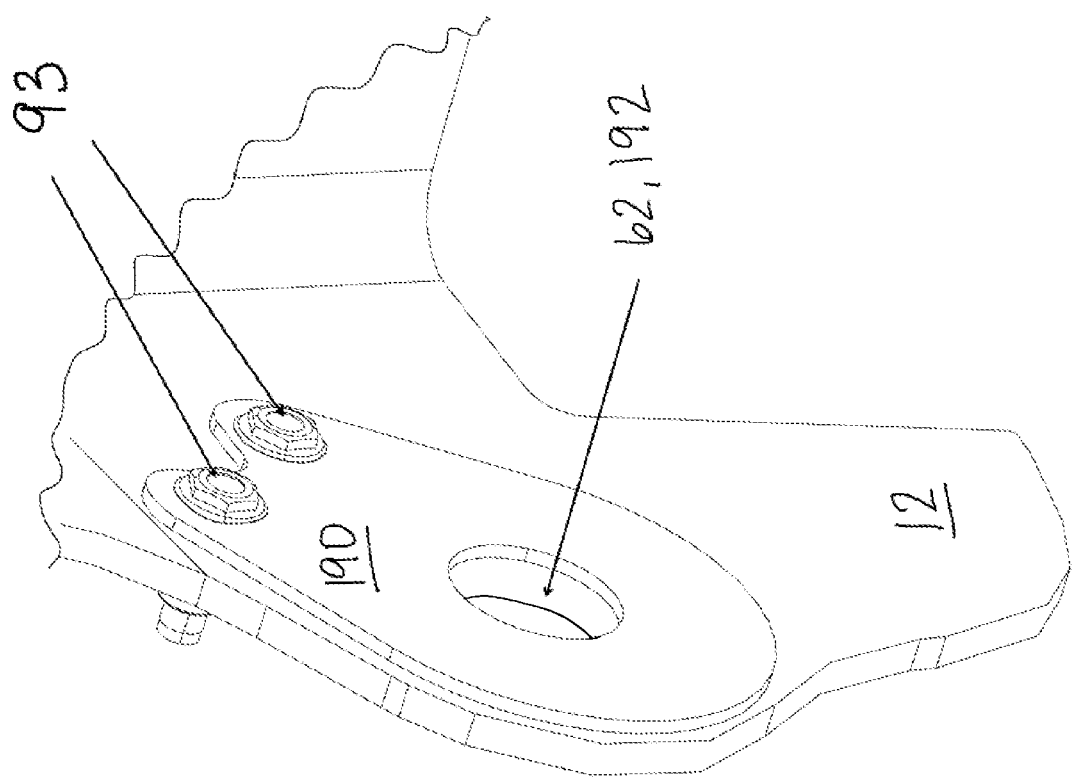
FIG. 7 is a perspective view of the wear plate and portions of the frame of FIG. 2, with the wear plate connected to the frame portions by bolts.

The wear plate 190 is selectively fastened to the frame 12 by two plate fasteners 193 extending through the alignment apertures 194. In the present embodiment, the plate fasteners 193 are rivets 193 riveted to the frame 12. The wear plate 195 is similarly fastened to the frame 12 by two rivets 199 extending through the alignment apertures 197. As is illustrated in FIG. 7, in some embodiments, the plate fasteners 193, or the plate fasteners 199, could be bolts 93. It is also contemplated that different fasteners could be used.

In order to replace a worn or damaged wear plate 190, 195, the plate fasteners 193, 199 would be removed and reinserted with a corresponding replacement wear plate 190, 195. Removing the wear plate 190, 195 begins with removing the fasteners 172, 174, 176, 177 allowing the suspension arms 110, 120 and the corresponding bushings 150, 160 to be removed from the frame 12. The rivets 193, 199 are then removed by first drilling through rivet heads of the rivets 193, 199 and prying off the rivet heads from the wear plates 190, 195. Rivet shafts of the rivets 193, 199 are then punched out from the wear plates 190, 195 and adjacent portions of the frame 12. The wear plates 190, 195 are then removed from the frame 12, if the wear plates 190, 195 have not already separated when punching out the rivet shafts. A new or replacement wear plate 190, 195 is then placed on the frame 12. The apertures 192, 194, 196, 197 are aligned with the corresponding apertures (such as the aperture 62) of the frame 12. New or replacement fasteners (rivets, bolts, etc.) are then inserted and connected through the apertures 194, 197. The suspension arms 110, 120 and the corresponding bushings 150, 160 are then reconnected to the frame 12. For embodiments using the bolts 93 to connect one or both wear plates 190, 195, the plates 190, 195 are removed by removing the nuts and bolts 93 from the frame 12. When connecting the replacement plates 190, 195, in some cases the same nuts and bolts 93 could be used.

The alignment apertures 194, 197 and the plate fasteners 193, 199 aid in maintaining the wear plates 190, 195 rotationally fixed relative to the frame 12. While tension of the fasteners 172, 176 should maintain the wear plates 190, 195 in place, slippage of the inner races 152, 162 could apply a torque to the corresponding wear plate 190, 195 that could otherwise cause the wear plate 190, 195 to rotate and rub the surrounding portions of the frame 12. In some cases, the alignment apertures 194, 197 and the plate fasteners 193, 199 could also aid in maintaining a correct alignment of a pivot axis of the bushings 150, 160, by centering the corresponding shaft aperture 192, 196. In the case where the frame aperture 62 is damaged, for example, the shaft aperture 192, 196 could aid in properly aligning the bushing 150, 160.

Figure 8:
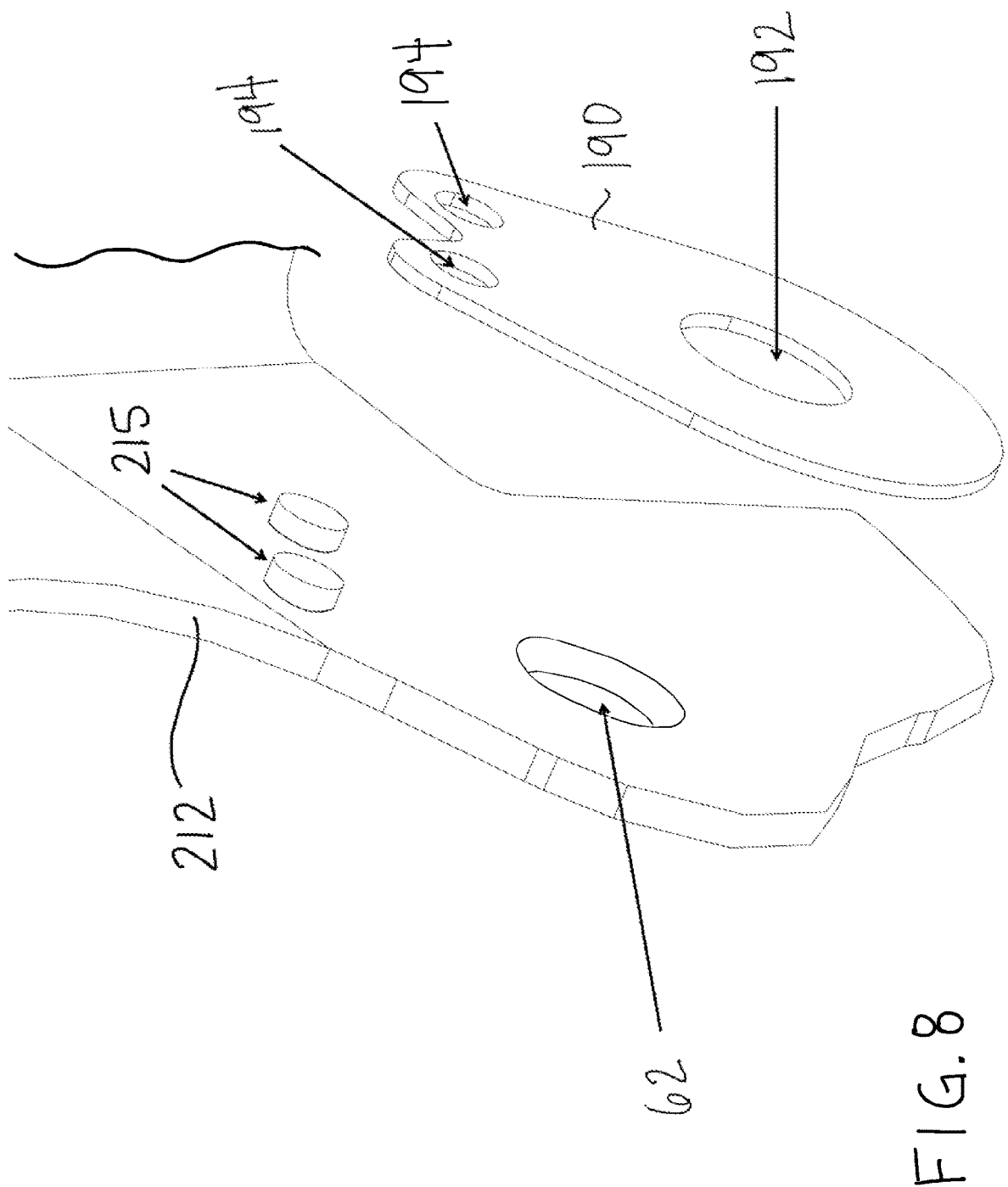
FIG. 8 is an exploded, perspective view of the wear plate of FIG. 6 and portions of another embodiment of a frame of a vehicle.
Figure 9:
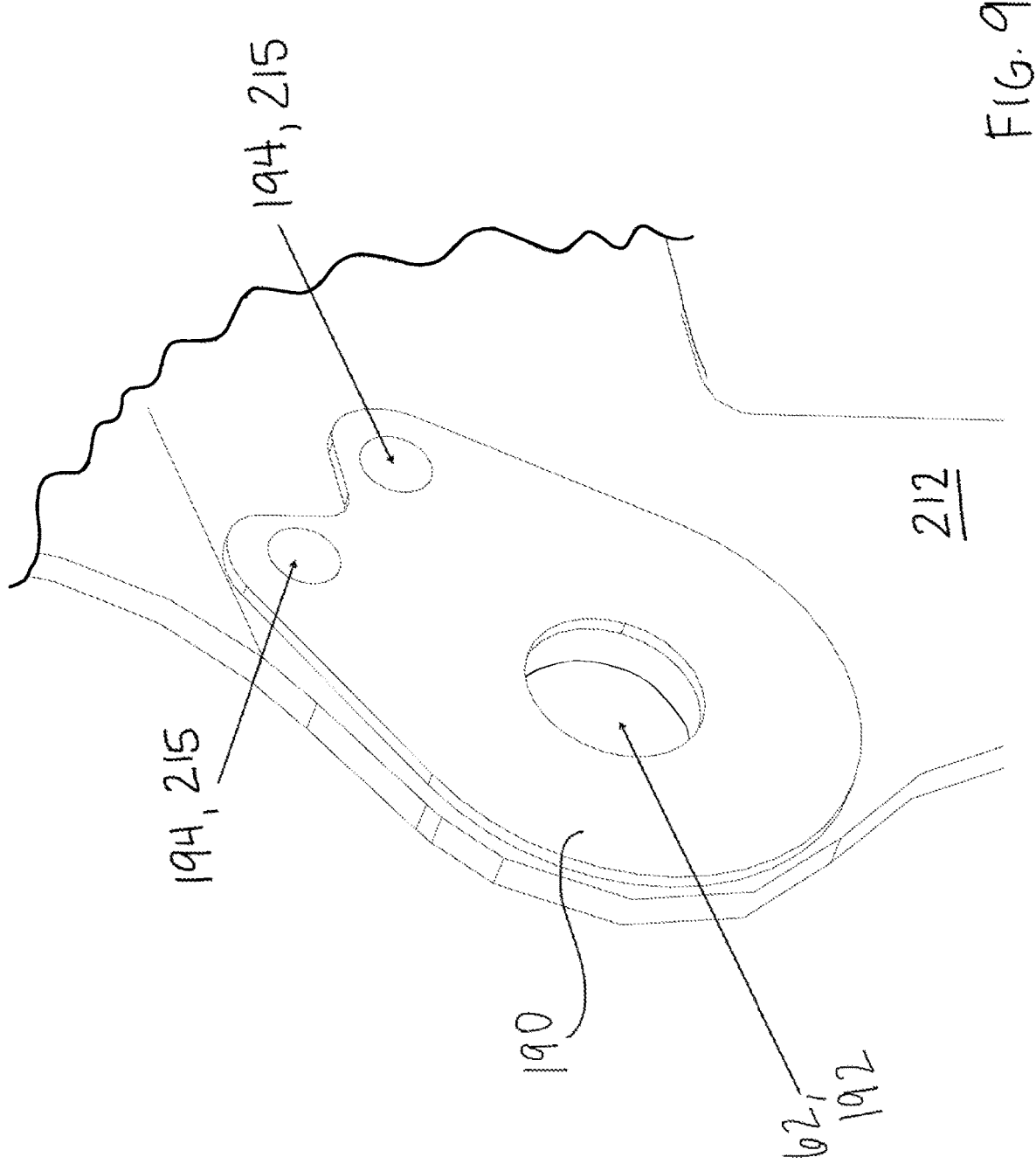
FIG. 9 is a perspective view of the wear plate and portions of the frame embodiment of FIG. 8, with the wear plate in an operational position on the frame portion.

In some embodiments, a different embodiment of a vehicle frame 212 could include one or more protrusions 215 to be received in the alignment apertures 194, as is illustrated in FIGS. 8 and 9. In some embodiments, frame protrusions could additionally or alternatively be included to be received in the alignment apertures 197 (not shown).

Figure 10:
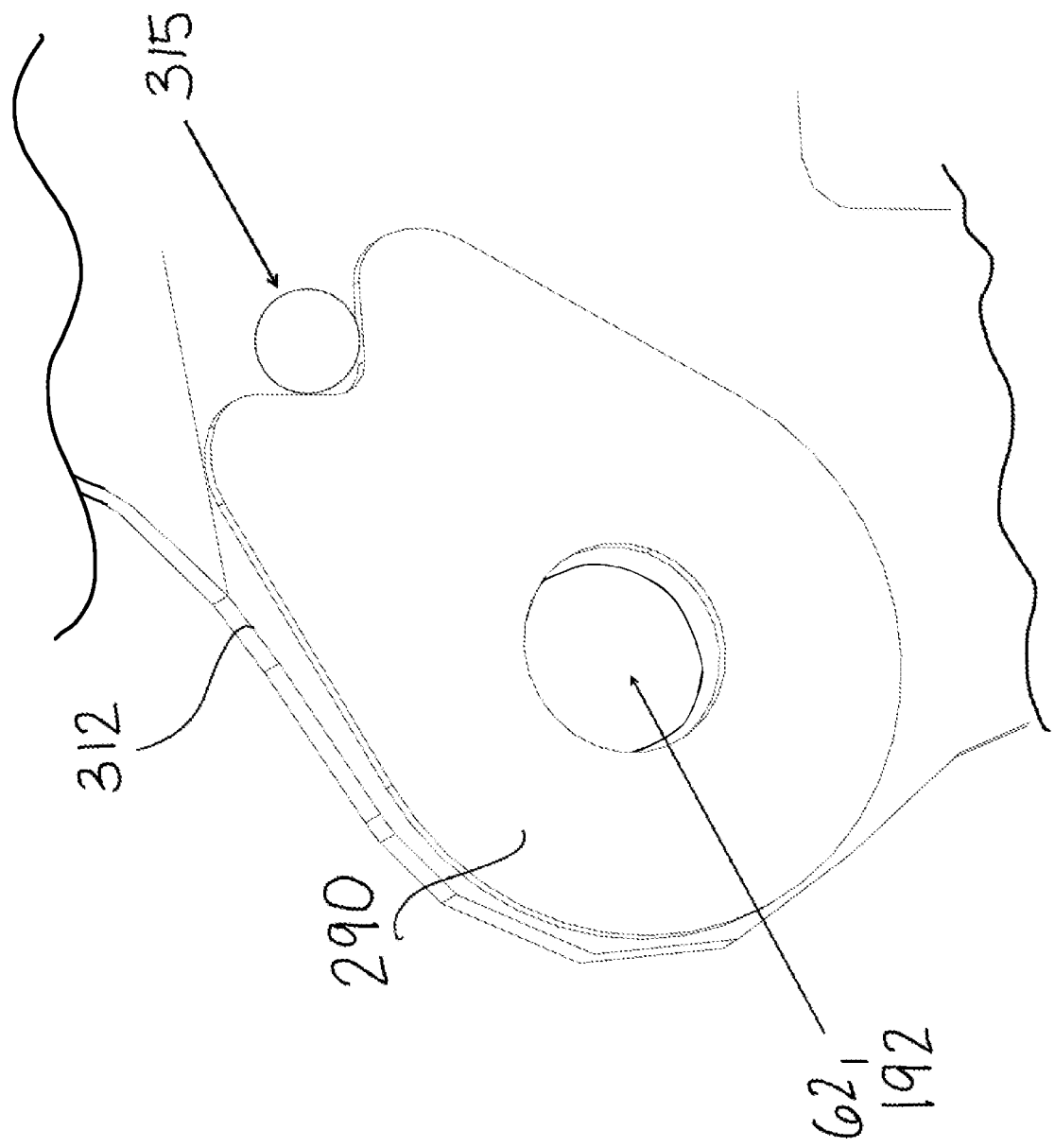
FIG. 10 is a perspective view of another embodiment of a wear plate and portions of another embodiment of a frame of a vehicle.

Another non-limiting embodiment of a wear plate 290 is illustrated in FIG. 10. The wear plate 290 does not include alignment apertures, but instead is shaped and sized to abut a protrusion 315 of another embodiment of a frame 312 to maintain correct positioning of the wear plate 290, both in terms of maintaining rotational position of the wear plate 290 and of maintaining correct position of the shaft aperture 192. By being shaped to abut one or more protrusions 315, the wear plate 290 is formed to impede rotational movement if the inner race 152 of the bushing 150 slips, without use of alignment apertures. In some embodiments, rivets could be used to form the protrusions 215 or 315. It is also contemplated that a protrusion could be installed on the frame 12 during restoration of alignment during, for example, factory restoration. When replacing wear plates 190, 290 using frame protrusions, the plates 190, 290 are simply pulled away from the frame 12 and the protrusions 215, 315 when the bushings 150, 160 have been removed. Installation of new or replacement plates 190, 290 includes then aligning and slide-fitting the replacement plates 190, 290 on the protrusions 215, 315 and the frame 12.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   a motor connected to the frame;
   at least one ground engaging member operatively connected to the motor;
   at least one suspension member pivotally connecting the at least one ground engaging member to the frame;
   at least one double bonded bushing pivotally connecting the at least one suspension member to the frame, the at least one double bonded bushing being disposed in an end portion of the at least one suspension member;
   at least one wear plate disposed between a first end of the at least one double bonded bushing and the frame, the at least one wear plate being rotationally fixed to the frame, the first end of the at least one double bonded bushing abutting the at least one wear plate, the at least one wear plate being selectively removable from the vehicle; and
   at least one shaft extending through a portion of the frame, the at least one double bonded bushing, and the at least one wear plate,
   an inner race of the at least one double bonded bushing being prevented from rotating relative to the frame when the at least one shaft is tensioned through the at least one double bonded bushing, the inner race of the at least one double bonded bushing being tightened against the at least one wear plate.

2. The vehicle of claim 1, wherein at least a first end of the inner race of the at least one double bonded bushing is textured, the textured first end of the inner race abutting the at least one wear plate.

3. The vehicle of claim 2, wherein at least the first end of the inner race of the at least one double bonded bushing is serrated.

4. The vehicle of claim 1, wherein:
   the at least one wear plate is a first wear plate; and
   further comprising a second wear plate disposed between and abutting a second end of the at least one double bonded bushing and the frame, the second end being oppositely disposed to the first end of the at least one double bonded bushing.

5. The vehicle of claim 1, wherein:
   the at least one wear plate defines therein at least one alignment aperture;
   the at least one wear plate defines a shaft aperture therein, the at least one shaft extending therethrough; and
   the at least one alignment aperture is offset and separate from the shaft aperture.

6. The vehicle of claim 5, wherein:
   the frame includes at least one protrusion; and
   the at least one protrusion of the frame is received in the at least one alignment aperture.

7. The vehicle of claim 5, wherein at least one plate fastener extends through the alignment aperture of the at least one wear plate to fasten the at least one wear plate to the frame.

8. The vehicle of claim 7, wherein the at least one plate fastener is at least one rivet.

9. The vehicle of claim 7, wherein the at least one plate fastener is at least one bolt.

10. The vehicle of claim 5, wherein the at least one shaft is formed by at least one fastener extending through the portion of the frame, the at least one double bonded bushing, and the shaft aperture of the at least one wear plate.

11. The vehicle of claim 1, wherein:
    the at least one suspension member is a plurality of suspension members;
    the at least one double bonded bushing is a plurality of bushings, one of the plurality of double bonded bushings being disposed in an end portion of each one of the plurality of suspension members; and
    the at least one wear plate is a plurality of wear plates.

12. The vehicle of claim 1, wherein the at least one wear plate is shaped to abut at least one protrusion of the frame to impede rotational movement of the at least one wear plate.

* * * * *